United States Patent

Berg et al.

[11] Patent Number: 6,115,223
[45] Date of Patent: *Sep. 5, 2000

[54] ELONGATE MICROACTUATOR SPANNING LEADING EDGE SURFACE OF SLIDER

[75] Inventors: Lowell J. Berg, Minnetonka; Zine-Eddine Boutaghou, Vadnais Heights, both of Minn.

[73] Assignee: Seagate Technology, Inc., Scotts Valley, Calif.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/930,134

[22] PCT Filed: Oct. 30, 1997

[86] PCT No.: PCT/US97/19816

§ 371 Date: Oct. 30, 1997

§ 102(e) Date: Oct. 30, 1997

[87] PCT Pub. No.: WO98/25264

PCT Pub. Date: Jun. 11, 1998

Related U.S. Application Data

[63] Continuation-in-part of application No. 08/852,087, May 7, 1997, Pat. No. 5,898,541, and a continuation-in-part of application No. 08/852,225, May 6, 1997, Pat. No. 5,856,896.
[60] Provisional application No. 60/032,348, Dec. 4, 1996, provisional application No. 60/031,578, Dec. 5, 1996, and provisional application No. 60/041,194, Mar. 25, 1997.

[51] Int. Cl.$^7$ .................................................. G11B 21/24
[52] U.S. Cl. ........................................................ 360/294.4
[58] Field of Search ................................... 360/109, 103, 360/104, 294.4, 294.3, 294.1

[56] References Cited

U.S. PATENT DOCUMENTS

| | | | |
|---|---|---|---|
| 5,034,828 | 7/1991 | Ananth et al. | 360/75 |
| 5,105,408 | 4/1992 | Lee et al. | 369/44.15 |
| 5,189,578 | 2/1993 | Mori et al. | 360/166 |
| 5,276,573 | 1/1994 | Harada et al. | 360/103 |
| 5,657,188 | 8/1997 | Jurgenson et al. | 360/106 |
| 5,856,896 | 1/1999 | Berg et al. | 360/104 |
| 5,920,441 | 7/1999 | Cunningham et al. | 360/78.05 |
| 6,002,549 | 12/1999 | Berman et al. | 360/104 |

FOREIGN PATENT DOCUMENTS

| | | |
|---|---|---|
| 0 242 597 | 10/1987 | European Pat. Off. . |
| 3-134873 | 6/1991 | Japan . |
| 3-292610 | 3/1992 | Japan . |
| 06295417 | 10/1994 | Japan . |

OTHER PUBLICATIONS

"Magnetic Recording Head Positioning at Very High Track Densities Using a Microactuator–Based, Two–Stage Servo System" by Fan et al; *IEEE Transactions on Industrial Electronics*, vol. 42, No. 3, Jun. 1995.

(List continued on next page.)

*Primary Examiner*—David Davis
*Attorney, Agent, or Firm*—Kinney & Lange, P.A.

[57] ABSTRACT

A disc drive having an actuator arm to support a slider carrying a transducing head adjacent a selected data track of a disc having a plurality of concentric data tracks includes a microactuator on a leading edge surface of the slider to effect fine positioning of the transducing head with respect to the selected track. The microactuator includes a spatial region on the leading edge surface of the slider. A microactuator element spans the spatial region and is responsive to a voltage to selectively expand and contract, thereby bending to alter the position of the slider and the transducing head.

14 Claims, 11 Drawing Sheets

OTHER PUBLICATIONS

"Silicon Micromachined Electromagnetic Microactuators for Rigid Disk Drives" by Tang et al.; *IEEE Transactions on Magnetics*, vol. 31, No. 6, Nov. 1995.

"A Flexible Piggyback Milli–Actuator for Over 5 Gbit/in.$^2$ Density Magnetic Recording", by Koganezawa et al., *IEEE Transactions on Magnetics*, vol. 32, No. 5, Sep. 1996.

"Transverse Mode Electroststic Microactuator for MEMS–Based HDD Slider" by Imamura et al., *IEEE*, Jun. 1996.

"An Experiment for Head Positioning System Using Sub-micron Track–width GMR Head", by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors In Magnetic Disk Drives" by Imamura et al., *Advances in Information Storage Systems*, vol. 5, 1993.

"A Dual–Stage Magnetic Disk Drive Actuator Using a Piezoelectric Device for a High Track Density" by Mori et al., *IEEE Transactions on Magnetics*, vol. 27, No. 5, Nov. 1991.

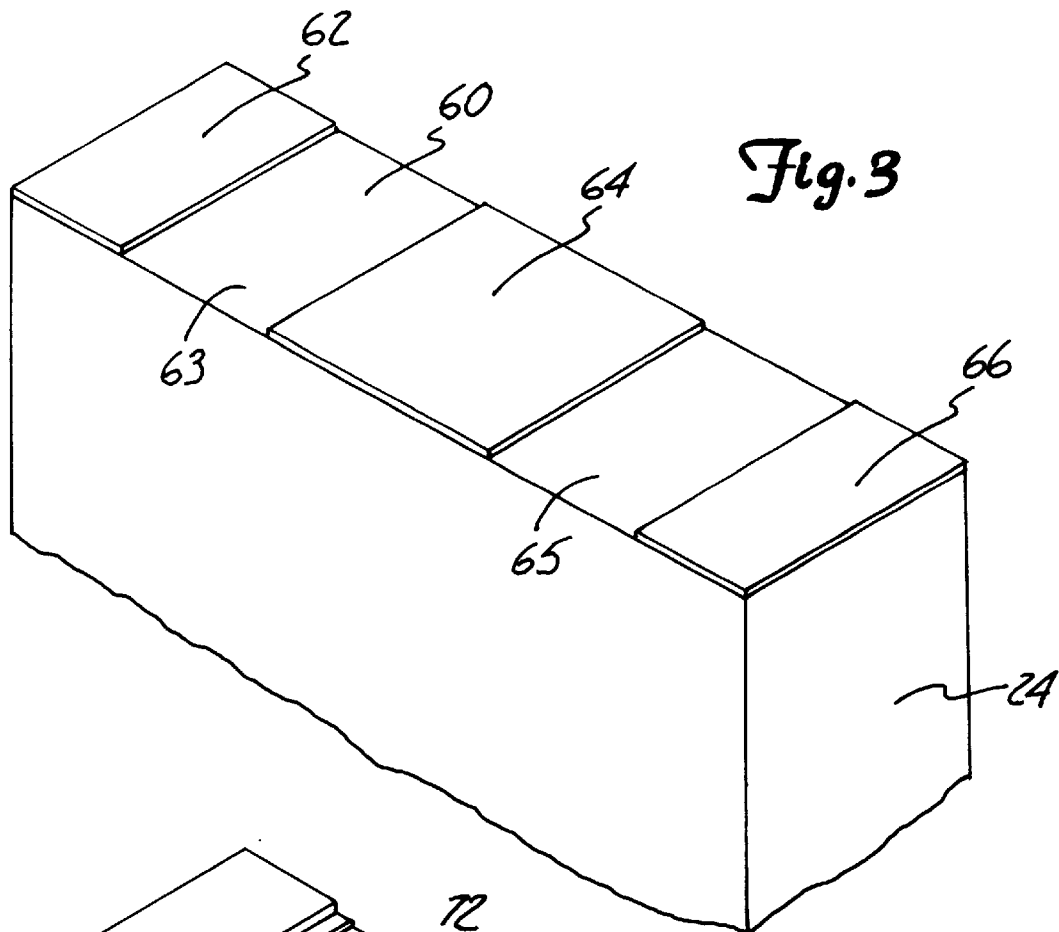
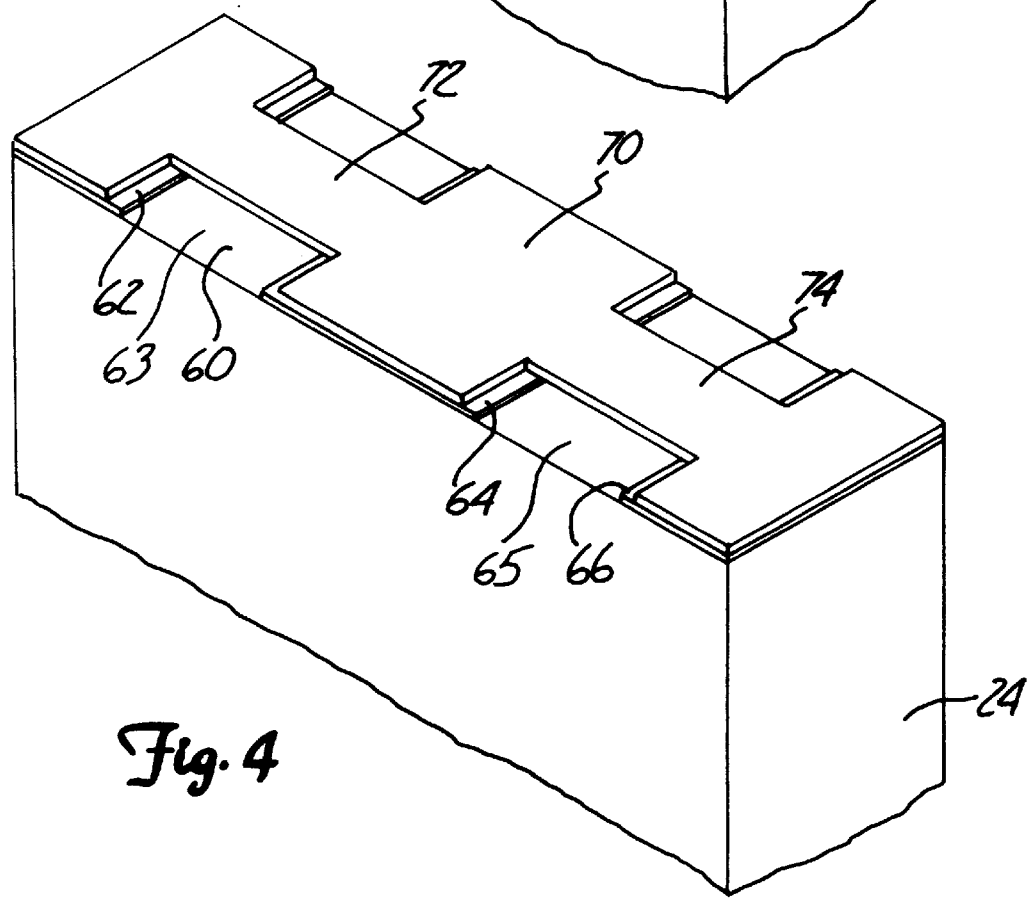

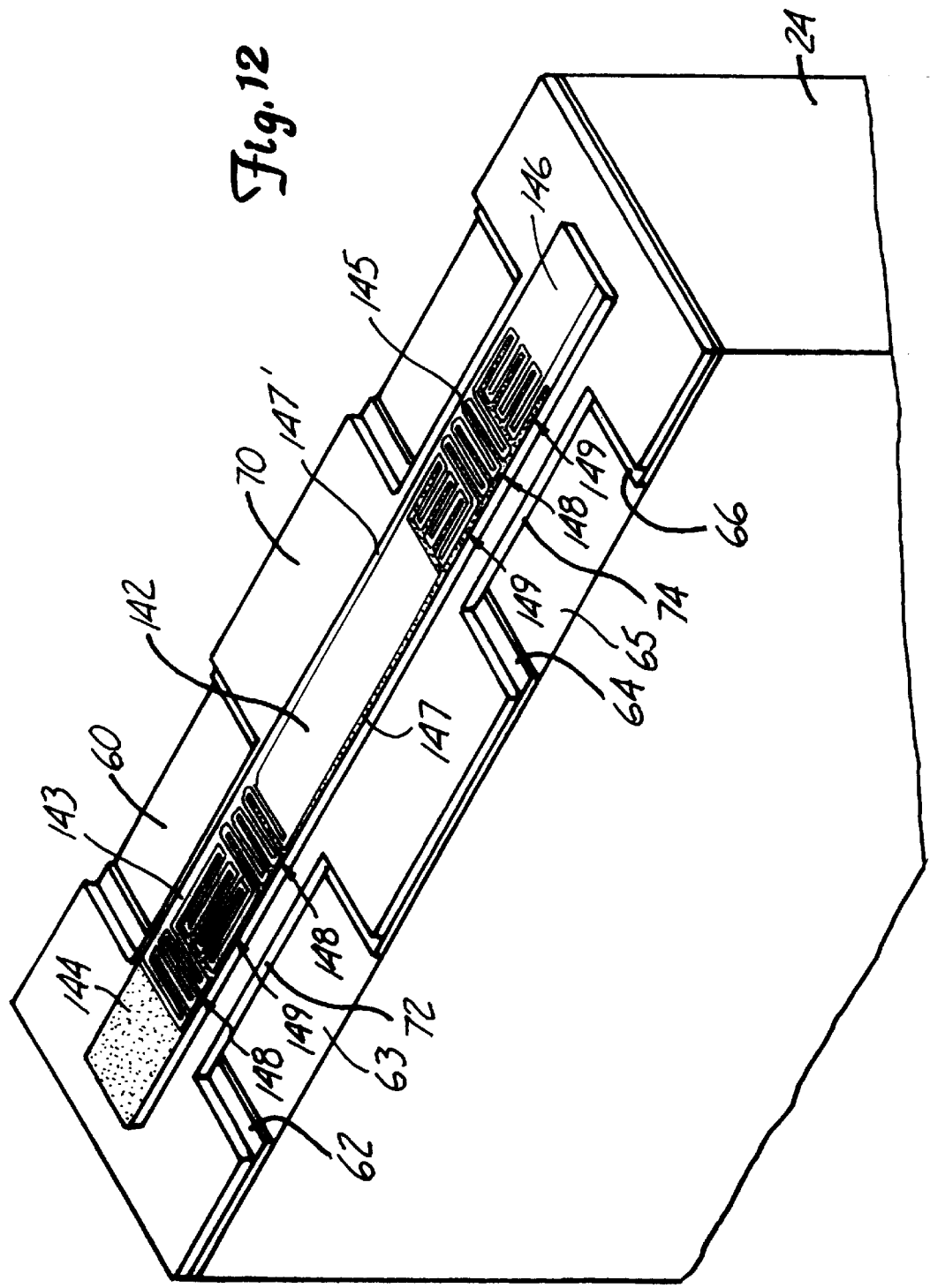

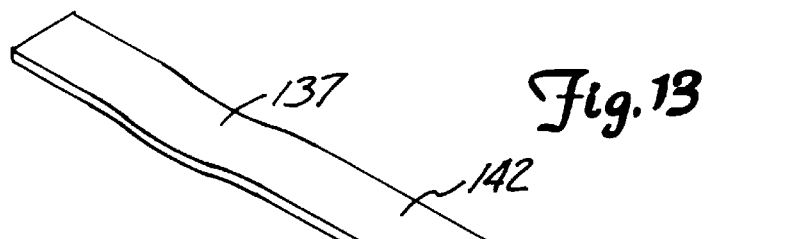
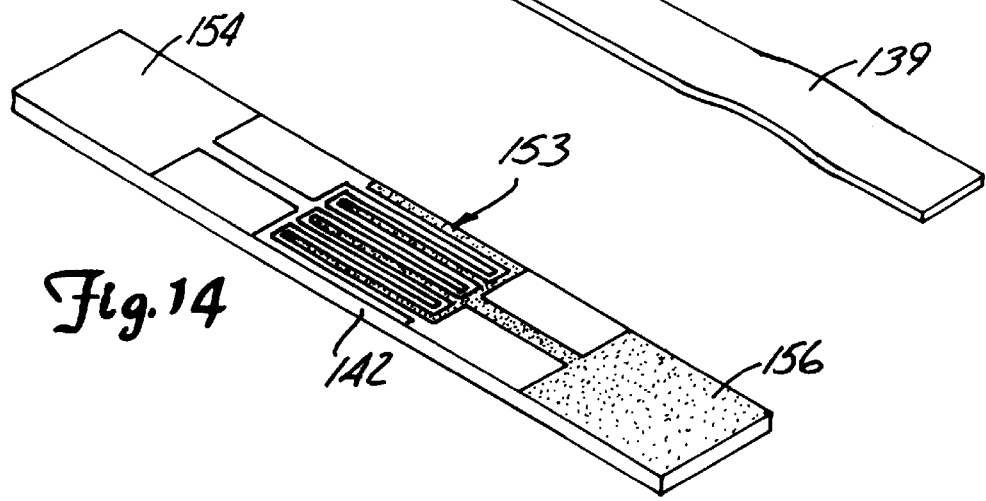
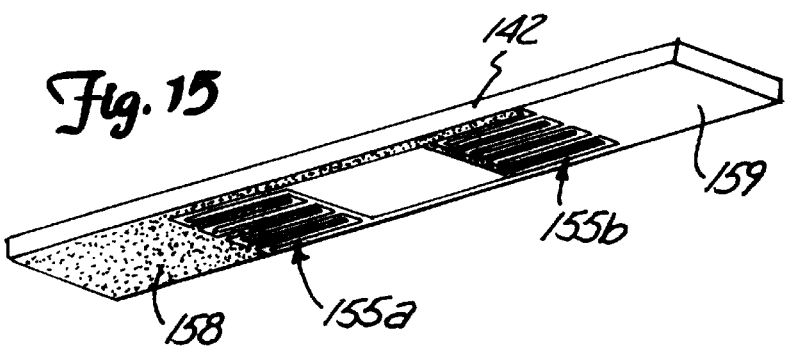
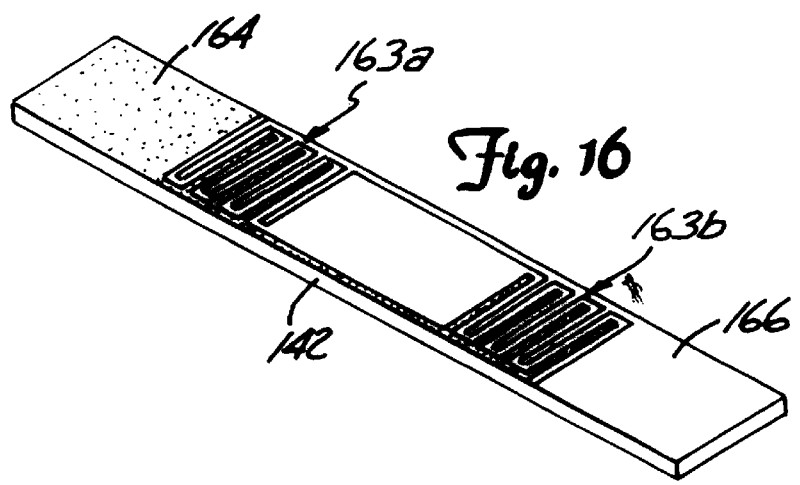

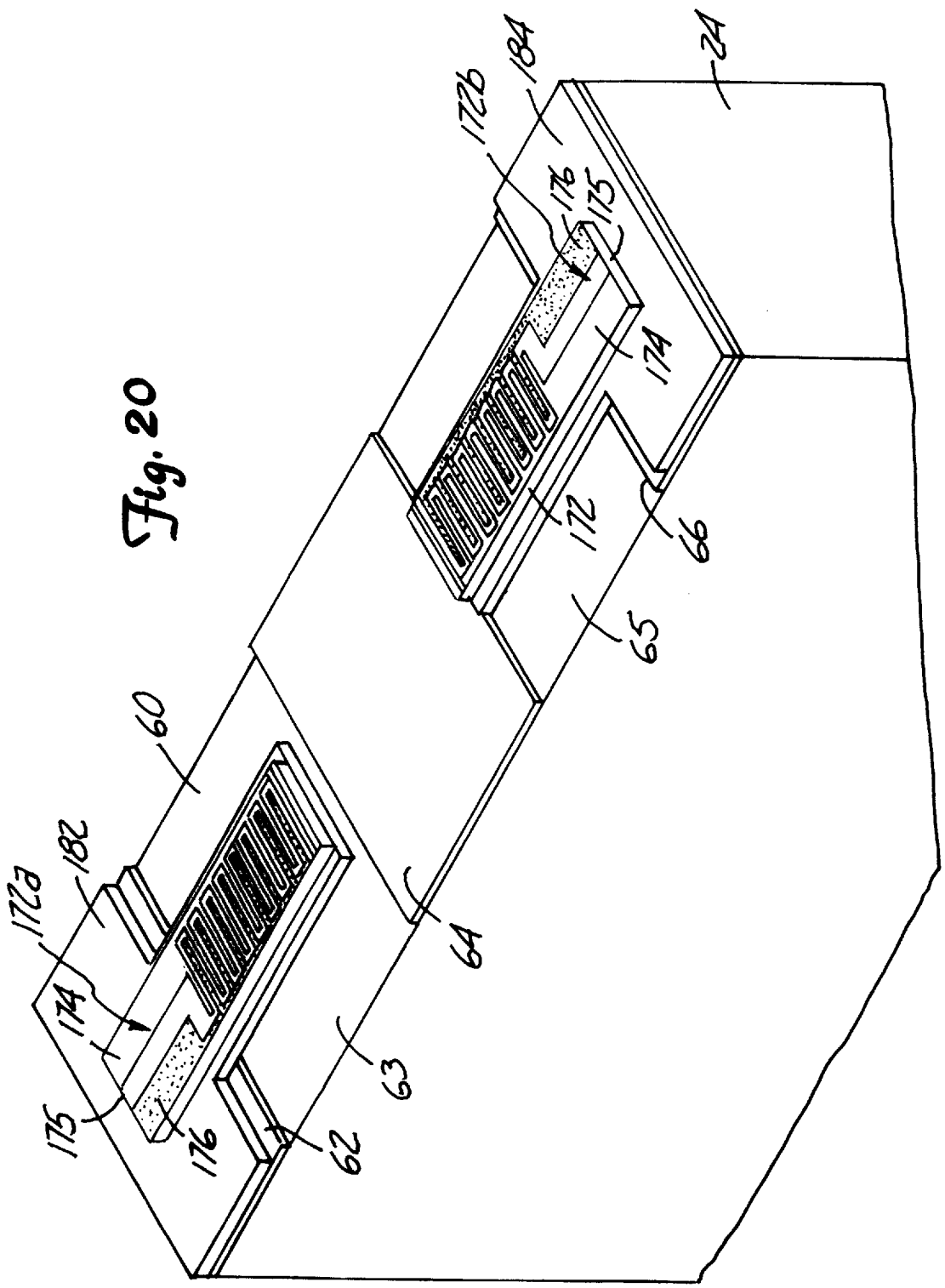

ELONGATE MICROACTUATOR SPANNING LEADING EDGE SURFACE OF SLIDER

This application is a 371 PCT/US97/19816, filed Oct. 30, 1997, this application claims benefit of provisional applications 60/032,348, filed Dec. 4, 1996, 60/031,578, filed Dec. 5, 1996, and 60/041,194, filed Mar. 25, 1997, and is a continuation in part of Ser. No. 08/852,087, filed May 7, 1997, now U.S. Pat. No. 5,898,541 and a continuation in part of Ser. No. 08/852,225, filed May 6, 1997, now U.S. Pat. No. 5,856,896.

BACKGROUND OF THE INVENTION

The present invention relates to a microactuator for fine positioning of a transducing head over a selected track of a rotatable disc of a disc drive, and more particularly to a piezoelectric microactuator fabricated at the wafer level by conventional thin film techniques used to manufacture the transducing head on the slider.

The density, or radial spacing, between concentric data tracks on magnetic discs continues to increase, requiring greater precision in head positioning. Conventional disc drives accomplish head positioning by operating an actuator arm with a large scale motor, such as a voice coil motor, to position a head on a gimbal at the end of the actuator arm. The large scale motor lacks sufficient resolution to effectively accommodate high track-density discs. Thus, a high resolution head positioning mechanism is necessary to accommodate the more densely spaced tracks.

One promising design for high resolution head positioning employs a high resolution microactuator in addition to the conventional low resolution actuator, thereby effecting head positioning through dual-stage actuation. Various microactuator designs have been considered to accomplish high resolution head positioning, including piezoelectric, electromagnetic, electrostatic, capacitive, fluidic, and thermal actuators. Various locations for the microactuator have been suggested, one such microactuator being at the interface between the gimbal and the slider, as described in U.S. patent application Ser. No. 08/852,087, filed May 7, 1997 now U.S. Pat. No. 5,898,541 by Z. Boutaghou and L. Berg, which is hereby incorporated herein by reference in its entirety. However, many previous microactuator designs were directed to microactuators fabricated independently of the slider which had to be subsequently attached to the slider. Consequently, the microactuator could not be fabricated during the same thin film wafer processing for manufacturing the slider and transducing head, and additional tooling and assembly steps were required to attach the microactuator to the slider. As a result, the complexity of the manufacturing process was increased and additional fabrication steps, separate from existing manufacturing techniques, were required, making these microactuator designs prohibitively expensive and inefficient to produce.

There is a need for a microactuator design that provides high resolution head positioning and that can be manufactured efficiently and inexpensively. More particularly, there is a need for a microactuator design that can be fabricated onto the slider using existing wafer processing techniques.

SUMMARY OF THE INVENTION

The present invention is a microactuator for use in a disc drive having an actuator arm to support a slider carrying a transducing head adjacent a selected track of a disc having a plurality of concentric tracks. The microactuator includes a spatial region on the leading edge surface of the slider. A microactuator element spans the spatial region and is responsive to a voltage to selectively expand and contract, thereby bending to alter the position of the slider and the transducing head. In one embodiment, the microactuator element includes a beam spanning the spatial region and a piezoelectric element supported on the beam. In a further embodiment, the microactuator includes a second spatial region on the leading edge surface of the slider and a second beam spanning the second spatial region. A second microactuator element is supported on the second beam and is responsive to a voltage to selectively expand and contract, thereby bending the second beam complementary to bending of the first-named beam to alter the position of the slider and the transducing head.

In another embodiment, the microactuator element is an elongated piezoelectric element on the beams, poled in a first direction. The elongated piezoelectric element has top and bottom surfaces and includes first and second conductors patterned on the top surface. The elongated piezoelectric element is responsive to a voltage difference between the first and second conductors to selectively expand and contract, thereby oppositely bending the beams to alter the position of the slider and the transducing head.

In a further embodiment, the beam is a cantilevered beam restrained at a first end, the microactuator element is a piezoelectric element on the cantilevered beam, poled in a first direction and restrained at the first end of the cantilevered beam. The piezoelectric element has top and bottom surfaces and includes first and second conductors selectively patterned on the top surface and third and fourth conductors selectively patterned on the bottom surface. The piezoelectric element is responsive to voltage differences between the first and second conductors and between the third and fourth conductors to selectively expand and contract, thereby bending the cantilevered beam to alter the position of the slider and the transducing head.

Another aspect of the invention is a method of forming a microactuator on a leading edge surface of a slider carrying a transducing head to effect fine positioning of the transducing head with respect to a selected track of a disc having a plurality of concentric tracks. A spatial region is formed on the leading edge surface of the slider, and a beam is formed spanning the first spatial region. A microactuator element is formed on the beam from a piezoelectric material having top and bottom surfaces. The microactuator element is poled in a first direction, so that the piezoelectric material is responsive to a voltage difference between the top surface and the bottom surface to selectively expand and contract, thereby bending the beam to alter the position of the slider and the transducing head. In one embodiment, a second spatial region is formed on the leading edge surface of the slider, and a second beam is formed spanning the second spatial region. A second microactuator element is formed on the second beam of a piezoelectric material having top and bottom surfaces. The second microactuator element is poled in the first direction, so that the piezoelectric material is responsive to a voltage difference between the top and bottom surfaces to selectively expand and contract, thereby bending the second beam to alter the position of the slider and the transducing head.

BRIEF DESCRIPTION OF THE DRAWINGS

FIGS. 3–8 are perspective views of fabrication stages of a piezoelectric microactuator formed on the leading edge surface of the slider according to a first embodiment the present invention.

FIGS. 11 and 12 are perspective views of fabrication stages of a piezoelectric microactuator according to a second embodiment of the present invention.

FIG. 13 is a perspective view illustrating the bending configuration achieved by the microactuator of FIGS. 11 and 12.

FIGS. 14 and 15 are perspective views of electrodes for a piezoelectric microactuator according to a third embodiment of the present invention.

FIGS. 16 and 17 are perspective views of electrodes for a piezoelectric microactuator according to a fourth embodiment of the present invention.

FIG. 20 is a perspective view of the cantilevered piezoelectric microactuator according to the fifth embodiment of the invention.

DETAILED DESCRIPTION OF THE PREFERRED EMBODIMENTS

Figure 1:
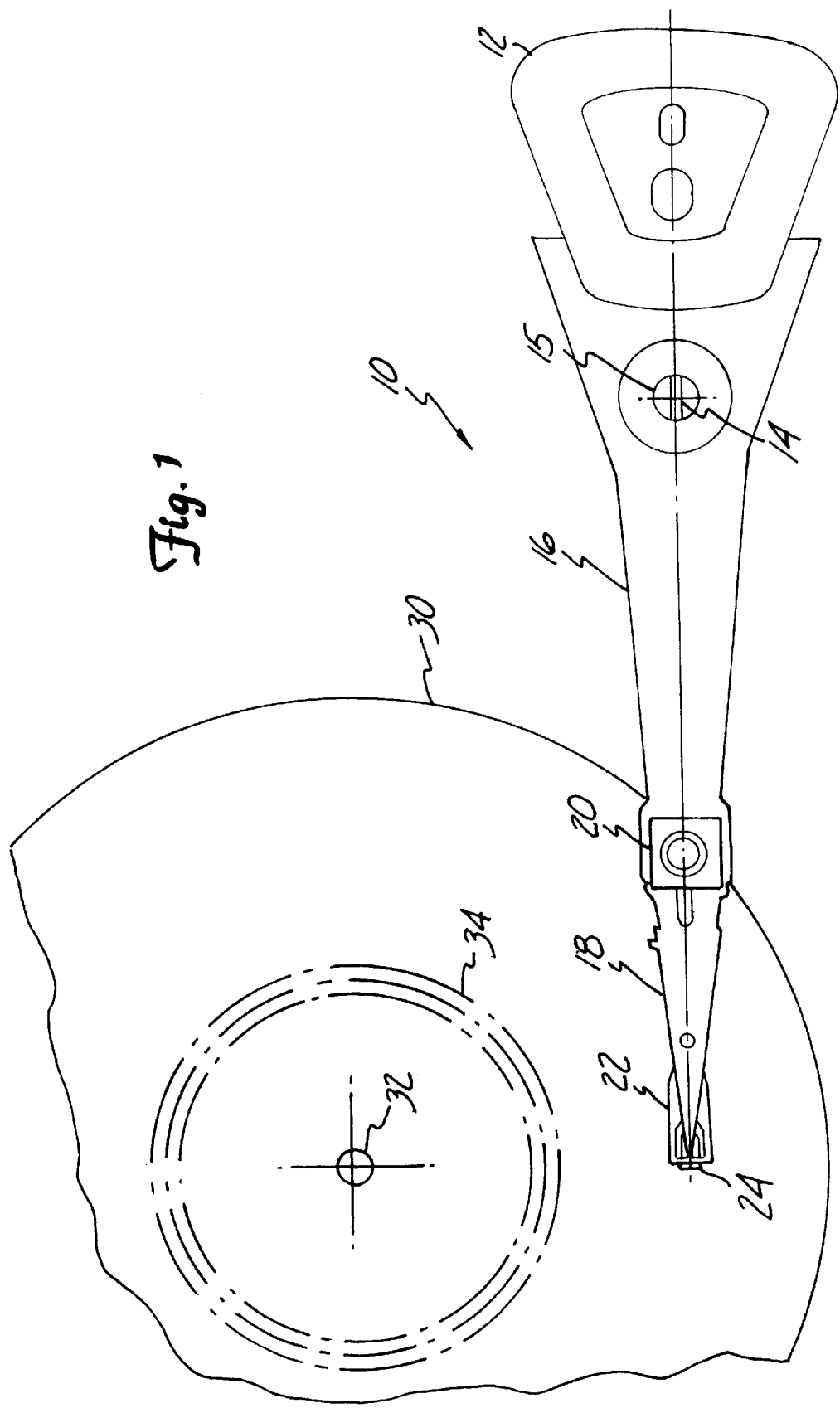
FIG. 1 is a top view of a disc drive actuation system for positioning a slider over tracks of a disc.

FIG. 1 is a top view of a disc drive actuation system 10 for positioning slider 24 over a track 34 of disc 30. Actuation system 10 includes voice coil motor (VCM) 12 arranged to rotate actuator arm 16 around axis 14. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on concentric or spiral tracks 34 of disc 30. Disc 30 rotates around axis 32, so that windage is encountered by slider 24 to keep it aloft a small distance above the surface of disc 30.

VCM 12 is selectively operated to move actuator arm 16 around axis 14, thereby moving slider 24 between tracks 34 of disc 30. However, for disc drive systems with high track density, VCM 12 lacks sufficient resolution and frequency response to position a transducing head of slider 24 over a selected track 34 of disc 30. Therefore, a higher resolution and higher frequency response actuation device is necessary.

Figure 2:
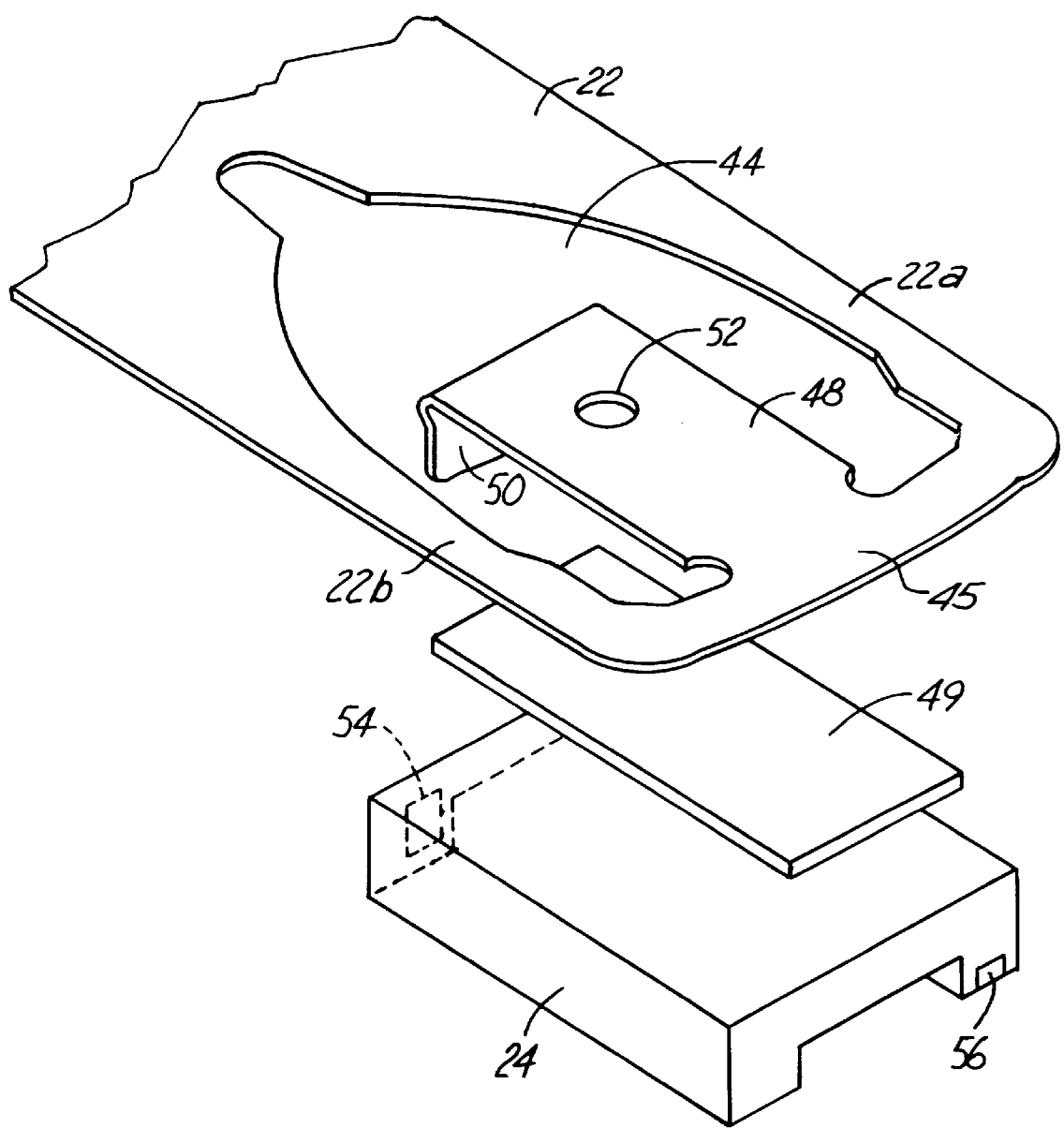
FIG. 2 is an exploded perspective view of a portion of a disc drive system implementing a piezoelectric microactuator at a leading edge of a slider according to the present invention.

FIG. 2 is an exploded perspective view of a portion of a disc drive system implementing a leading edge slider microactuation system according to the present invention. The disc drive system includes a gimbal or flexure 22 mounted to the underside of a distal end of head suspension load beam 18 (FIG. 1). Flexure 22 includes arms 22a and 22b forming aperture 44 therebetween to provide resilience or spring flexure to gimbal or flexure 22. The distal ends of arms 22a and 22b are connected via cross beam 45. Central tongue 48 extends from cross beam 45 into aperture 44 in a plane generally parallel to a plane defined by flexure arms 22a and 22b. Tongue 48 is cantilevered from cross beam 45 to flex in relation thereto, and is longer than those of gimbals of the prior art, extending beyond the leading edge surface of slider 24. Tongue 48 includes aperture 52, through which load beam 18 (FIG. 1) on actuator arm 16 applies a pre-load force to slider 24. The portion of tongue 48 extending beyond the leading edge surface is bent downward into a right angle to form a flexure tab surface 50, which is generally parallel to the leading edge surface of slider 24. Slider 24 is rigidly attached to flexure tab surface 50, preferably where microactuator 54 is formed on the leading edge surface of slider 24. Optional shear layer 49 may be provided between tongue 48 and slider 24 to minimize the wear on slider 24. The structure and components of flexure 22 are described in greater detail in co-pending application U.S. Ser. No. 08/852,225 for "Improved Gimbal Suspension for Supporting a Head in a Disc Drive Assembly", filed May 7, 1997 now U.S. Pat. No. 5,856,896 by J. Liu, Z. Boutaghou and L. Berg, which is hereby incorporated herein by reference in its entirety.

Microactuator 54 is formed at the leading edge of slider 24, and cooperates with tab surface 50 to distortionally rotate slider 24 and thereby alter the position of transducing head 56 located at the trailing edge of slider 24. In some embodiments, a second microactuator is formed near the opposite side of the leading edge surface of slider 24, operating in cooperation with microactuator 54 to distortionally rotate slider 24. The specific operation of microactuator 54 and other alternative microactuators is discussed in detail below with respect to FIGS. 3–20. Microactuator 54 is employed to finely position slider 24, in addition to VCM 12. VCM 12 is initially operated to move actuator arm 16 and load beam 18 to coarsely position transducer 56, which is supported by slider 24, to various positions with respect to tracks 34 on a surface of disc 30 confronting the transducer.

FIGS. 3–8 are perspective views illustrating fabrication of slider 24 in accordance with a first embodiment of the present invention. As shown in FIG. 3, hills 62, 64 and 66 are formed on leading edge surface 60 of slider 24. Hills 62, 64 and 66 are preferably composed of a material that is electrically insulating and thermally compatible with the slider substrate and the ceramic member to be formed on the hills, such as a ceramic material. The regions 63 and 65 between hills 62, 64 and 66 are then filled with an easily removable material to form a structure having an exposed top surface coplanar with the exposed top surface of hills 62, 64 and 66. Subsequently, as shown in FIG. 4, ceramic member 70 formed of silica, alumina or zirconia, for example, is patterned on the planar surface formed by hills 62, 64 and 66 and regions 63 and 65. Ceramic member 70 extends the entire width of leading edge surface 60 of slider 24, and includes beam 72 spanning region 63 between hills 62 and 64, and beam 74 spanning region 65 between hills 66 and 64. After member 70 has been patterned, the material in regions 63 and 65 beneath structural beams 72 and 74 is removed, thereby leaving beams 72 and 74 to span the space between hills 62 and 64 and hills 64 and 66, respectively. For example, the material in regions 63 and 65 may be a metal that is removed by chemical etching, or a polymer or salt that is dissolved. Member 70 will be the carrier for the microactuator to control the positioning of slider 24, with structural beams 72 and 74 bending toward or away from slider 24 under the control of the microactuator.

Figure 5:
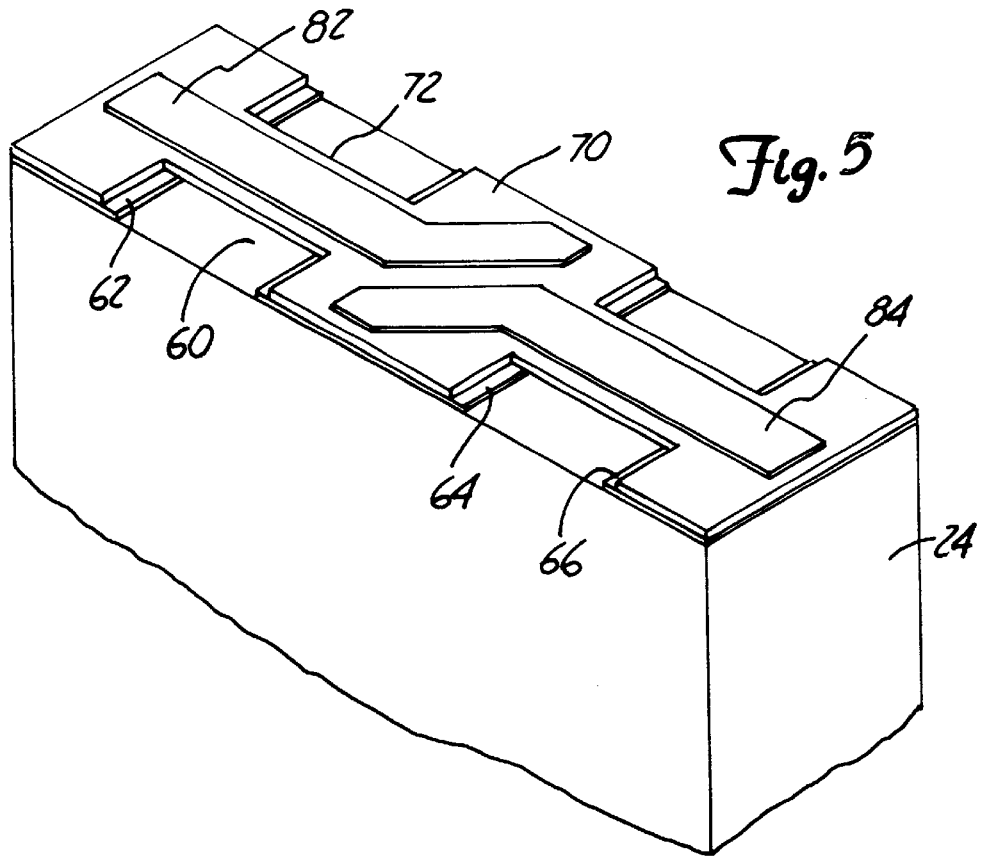
Figure 6:
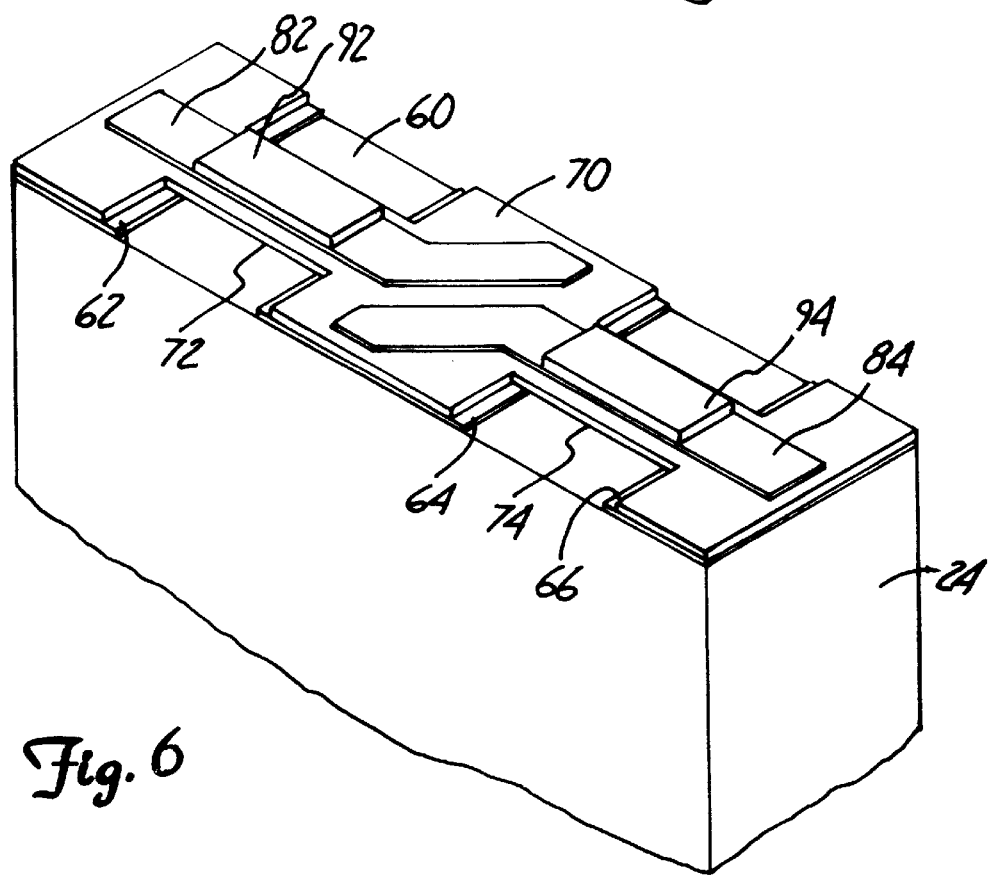

As shown in FIG. 5, bottom electrical conductors 82 and 84 are formed on member 70. The conductors preferably extend nearly to the lateral edges of slider 24 to permit connection to driving electronics (not shown) outside of the active area formed by beams 72 and 74 of the microactuator. As shown in FIG. 6, piezoelectric elements 92 and 94 are patterned on bottom electrical conductors 82 and 84, respectively, directly over the respective beams 72 and 74.

Piezoelectric elements 92 and 94 are preferably patterned only over beams 72 and 74 to facilitate bending and reduce undesirable stresses on the materials of the microactuator.

Figure 7:
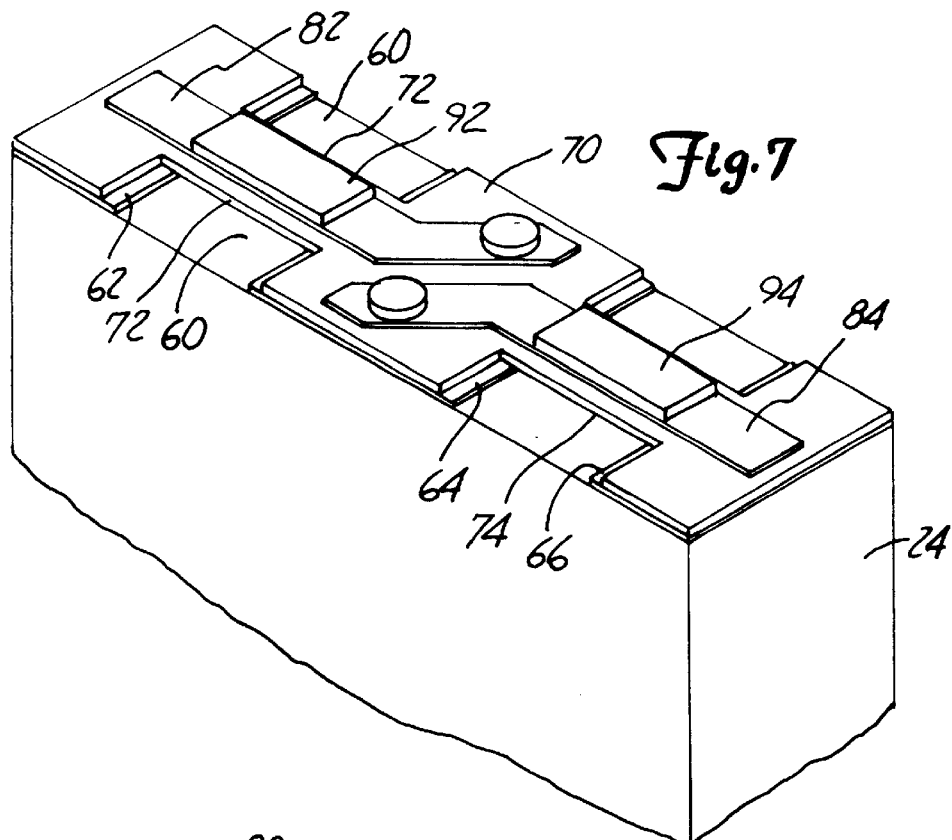
Figure 8:
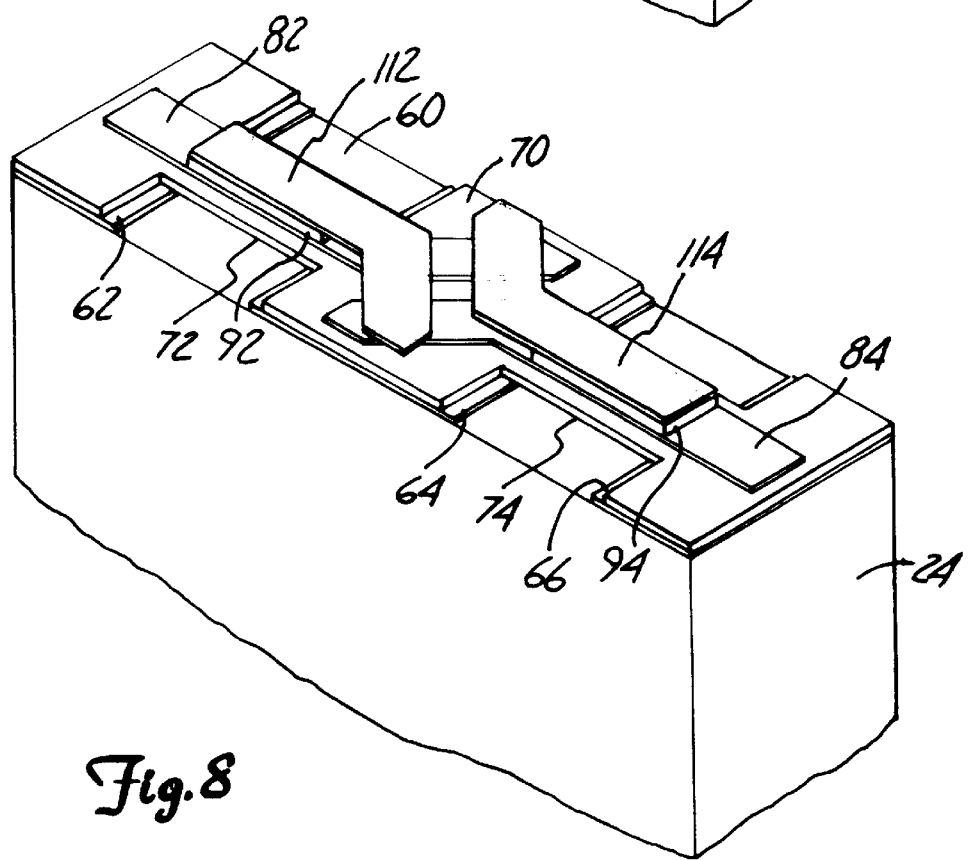

As shown in FIG. 7, conductive via structures 102 and 104 are patterned on bottom electrical conductors 82 and 84 near the center of slider 24, between the active microactuator beams 72 and 74. An insulating planarization layer 105 (FIG. 9) composed of a material such as compliant epoxy is applied over the structure, creating a planar surface that includes the top surfaces of piezoelectric elements 92 and 94, via structures 102 and 104, and planarization layer 105. The spaces under beams 72 and 74 are preferably masked off to prevent material from being deposited therein. After the insulating planarization layer 105 is applied, top electrical conductors 112 and 114 are patterned as shown in FIG. 8, contacting via structures 102 and 104 and the top surfaces of piezoelectric elements 92 and 94. Functionally, the configuration shown in FIG. 8 is a completed microactuator structure for slider 24.

Figure 9:
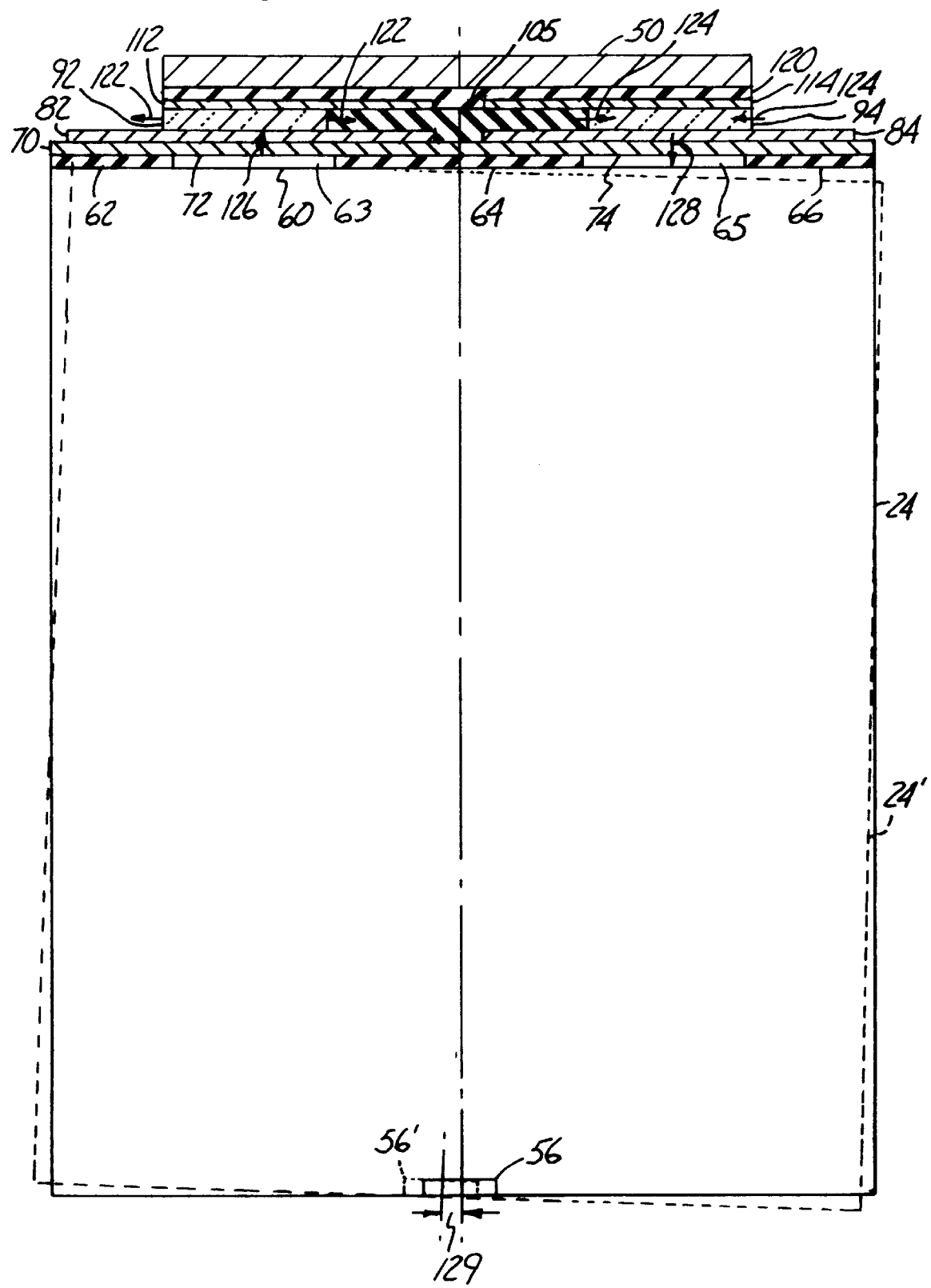
FIG. 9 is a section view of a completed piezoelectric microactuator formed on the leading edge surface of the slider according to the first embodiment present invention.

FIG. 9 is a section view of the layers and materials of the microactuator formed on leading edge surface 60 of slider 24. In order to implement slider 24 in a disk drive system, encapsulating layer 120 is provided over the microactuator formed of a compliant epoxy material, for example, and is bonded (such as by adhesive) to flexure tab surface 50 (FIG. 2). Thus, the microactuator reacts against flexure tab surface 50 to position transducing head 56 of slider 24 with respect to concentric tracks of a rotating disk.

In operation, a first voltage is applied to bottom electrical conductor 82, and a second voltage is applied to bottom conductor 84. Via structure 102 connects the first voltage to top electrical conductor 114, and via structure 104 connects the second voltage to top electrical conductor 112. Thus, the voltage differences across piezoelectric elements 92 and 94 are equal but opposite. In response to the voltage differences, one of piezoelectric elements 92 and 94 longitudinally expands while the other longitudinally contracts. In the example shown in FIG. 9, piezoelectric element 92 expands in the direction of arrows 122, while piezo electric element 94 contracts in the direction of arrows 124.

The expansion of piezoelectric element 92 causes structural beam 72 of member 70 to bend upward (away from slider 24) in the direction of arrow 126. Conversely, the contraction of piezoelectric element 94 causes structural beam 74 of member 70 to bend downward (toward slider 24) in the direction of arrow 128. These bending actions cause slider 24 to be rotationally displaced to the position 24' shown in dashed lines. Transducer 56, at the trailing edge of slider 24, is displaced to the position 56' shown in dashed lines as well, resulting in a total transducer displacement indicated by arrows 129. Thus, application of voltages to bottom electrical conductors 82 and 84 produces controllable displacement of transducer 56 at the trailing edge of slider 24.

Figure 10:
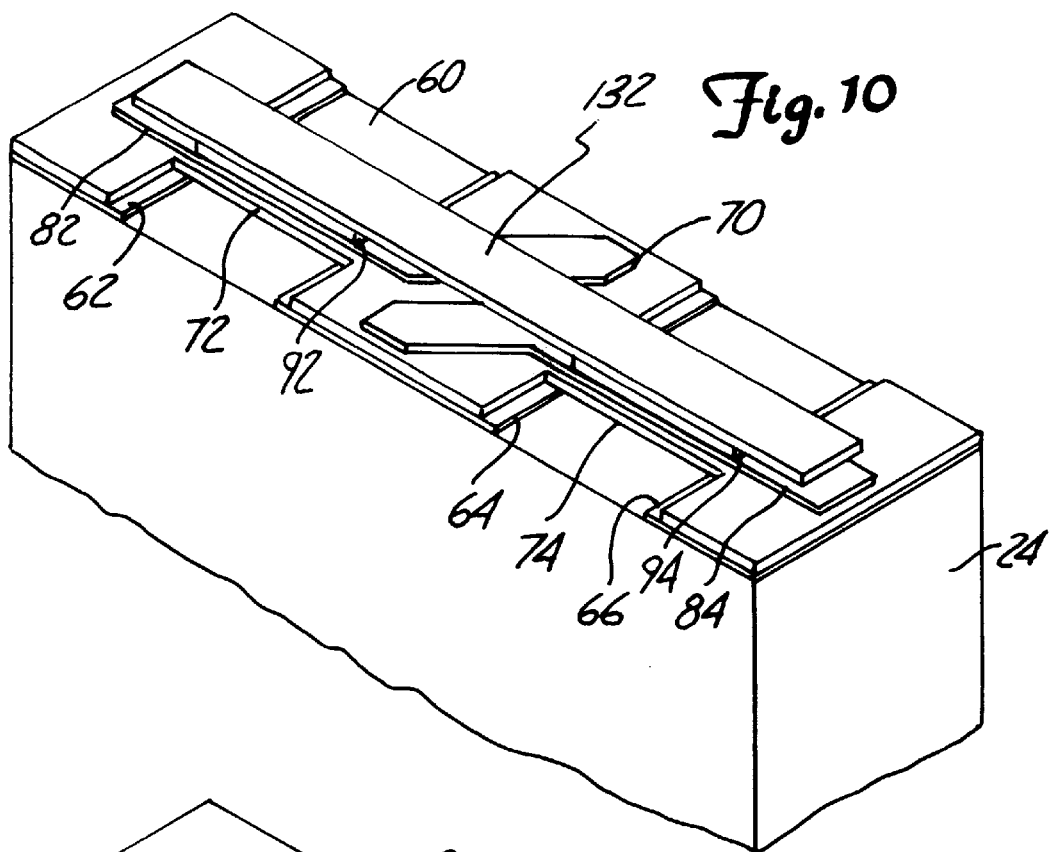
FIG. 10 is a perspective view of an intermediate fabrication stage of the piezoelectric microactuator of the first embodiment, utilizing a poling conductor.

FIG. 10 is a perspective view of an intermediate configuration of the piezoelectric microactuator on leading edge surface 60 of slider 24 for poling piezoelectric elements 92 and 94. It is desired that piezoelectric elements 92 and 94 be poled in the same direction, so that the opposite voltages across them will result in expansion of one piezoelectric element and contraction of the other piezoelectric element. If a poling field were to be applied to the configuration shown in FIGS. 8 and 9, piezoelectric elements 92 and 94 would be poled in opposite directions, and would therefore react in identical directions for the opposite voltages applied across the elements. Thus, an intermediate processing configuration is needed to pole piezoelectric elements 92 and 94 in the same direction without subjecting the entire wafer to a very high electric field.

The configuration of FIG. 10 illustrates one simple method of poling piezoelectric elements 92 and 94. The desired poling of piezo electric elements 92 and 94 is achieved by temporarily forming poling conductor 132 on top of piezoelectric elements 92 and 94. The two bottom conductors 82 and 84 (FIGS. 8 and 9) are coupled together to a reference voltage on one side of a poling circuit (not shown), and the temporary top conductor 132 is set to a large voltage on the other side of the poling circuit. As a result, piezoelectric elements 92 and 94 are poled in the same direction. After poling has been completed, temporary top conductor 132 is removed.

Those skilled in the art will recognize that other procedures may be used to pole piezoelectric elements 92 and 94 in the same direction. The design of the present invention provides sufficient flexibility so that several standard thin film photolithographic processes may be used to build and pole the layers of the microactuator. The materials chosen to form the layers should be compatible with the processes used. For example, if piezoelectric elements 92 and 94 must be heated to a very high temperature, the layers already in place during heating must be able to withstand the high temperatures. In this case, an exemplary material for bottom conductors 82 and 84 is platinum. The choice of materials and processes may be made based on design preferences, and does not limit the applicability of the present invention.

Figure 11:
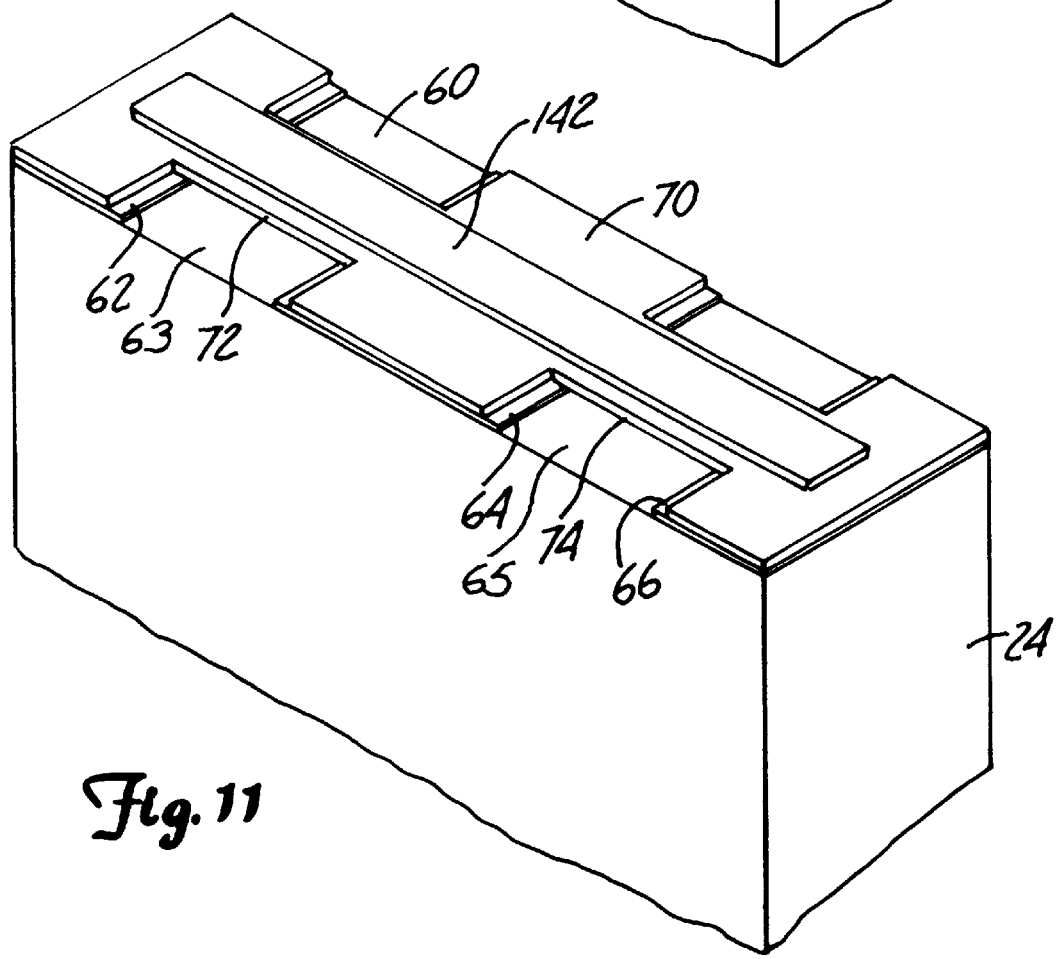

FIGS. 11 and 12 are perspective views of a piezoelectric microactuator according to a second embodiment of the invention. An elongated piezoelectric element 142 is formed on member 70, spanning nearly the entire length of leading edge surface 60 of slider 24, including beams 72 and 74 of member 70. As shown in FIG. 12, a pair of conductors are patterned on the top surface of piezoelectric element 142, terminating at conductive pads 144 and 146, respectively. Portions 143 and 145 are formed over spatial regions 63 and 65 and include interleaved electrode legs having lengths in a lateral direction in regions 148 and interleaved electrode legs having lengths in a longitudinal direction in regions 149. The legs connected to pad 144 are interleaved with the legs connected to pad 146 to form the interleaved regions 148 and 149, with extended portions 147 and 147' connecting the legs of portions 143 and 145 to the respective pads 144 and 146. As used in the exemplary embodiment shown herein, the direction along the longest length of piezoelectric element 142 is referred to as the longitudinal direction, the direction along the shortest length (vertical) is referred to as the thickness direction, and the intermediate length direction is referred to as the lateral direction. It will be understood to one skilled in the art that modifications may be made to the orientation of the electrode legs and pads while still providing the bending microactuator of the present invention.

Initially, a large voltage difference is applied between pads 144 and 146 to pole piezoelectric element 142. With piezoelectric element 142 so poled, application of voltages to pads 144 and 146 results in controllable straining and bending of piezoelectric element 142. Specifically, where the electrode legs are aligned with their lengths in the lateral direction in regions 148, the electric field produced by the voltage difference will have a substantial longitudinal component. There is also a thickness direction component, but this component does not significantly contribute to the bending of piezoelectric element 142. When the electric field has a substantial longitudinal component, the strain on piezoelectric element 142 will also have a substantial positive longitudinal component near the patterned conductors. Consequently, near the top of piezoelectric element 142, in regions 148 where the legs are aligned in the lateral direction, piezoelectric element 142 will be stretched longitudinally, and will undergo a lateral shrinkage. Conversely, where the electrode legs are aligned with their lengths in the longitudinal direction in regions 149, the electric field is substantially lateral. The result is a positive lateral strain and a negative longitudinal strain, so that piezoelectric element 142 shrinks longitudinally and stretches laterally near the patterned conductors.

As a result of the arrangement of the patterned conductive legs in regions 148 and 149 and the fields described above, the sandwich composed of member 70 (including beams 72 and 74), piezoelectric element 142 and the patterned conductors bends in response to a voltage applied to pads 144 and 146 having the same polarity as the initial poling voltage. The shape of this bending is shown in FIG. 13, such that piezoelectric element 142 has a dip at 137 and a bump at 139. When the voltage polarity applied to pads 144 and 146 is reversed, the sandwich bends in the opposite direction (dip 137 becomes a bump, and bump 139 becomes a dip). Thus, a deforming structure similar to that described in FIGS. 3–9 can be achieved with fewer material layers formed on leading edge surface 60 of slider 24.

In an alternative embodiment, member 70 is not included, but instead piezoelectric element 142 itself forms the bending structure of beams 72 and 74. This embodiment further reduces processing steps in forming the microactuator by eliminating a layer of the design. Operation of the microactuator is achieved in the same manner as that described above, with the portions of piezoelectric element 142 that form beams 72 and 74 spanning spatial regions 63 and 65 of the microactuator bending to effect the required mechanical movement to alter the position of slider 24.

FIG. 14 is a perspective view showing the top surface, and FIG. 15 is a perspective view showing the bottom surface, of an elongated piezoelectric element 142 having an alternative conductor pattern formed on both the top and bottom surfaces, according to a third embodiment of the present invention. Conductive pads 154 and 156 on the top surface of piezoelectric element 142 are connected to interleaved legs 153 extending in the longitudinal direction. Conductive pads 158 and 159 on the bottom surface of piezoelectric element 142 are connected to interleaved legs 155a and 155b extending in the longitudinal direction. A voltage difference is applied between pads 154 and 156, and also between pads 158 and 159. At the center of piezoelectric element 142, where legs 153 are aligned with their lengths in the longitudinal direction, the electric field near the top face of piezoelectric element 142 is substantially in the lateral direction, resulting in lateral stretching and longitudinal contraction of piezoelectric element 142 near its top surface. On the bottom surface of piezoelectric element 142, adjacent to the center of piezoelectric element 142, where legs 155a and 155b are aligned with their lengths in the longitudinal direction, there is a lateral electric field resulting in lateral stretching and longitudinal contraction of piezoelectric element 142 near its bottom surface. As a result, piezoelectric element 142 bends into the shape shown in FIG. 13. As discussed previously, reversing the polarity of voltages applied to pads 154, 156, 158 and 159 reverses the direction of bending.

Figure 17:
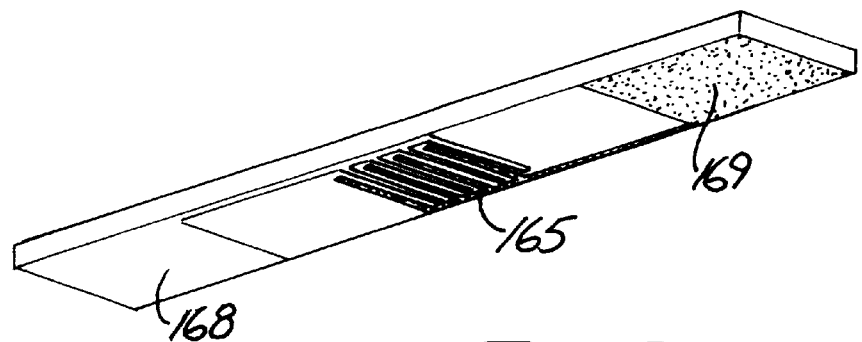

FIG. 16 is a perspective view showing the top surface, and FIG. 17 is a perspective view showing the bottom surface, of an elongated piezoelectric element 142 having another alternative conductor pattern formed on its top and bottom surfaces, according to a fourth embodiment of the present invention. Conductive pads 164 and 166 on the top surface of piezoelectric element 142 are connected to legs 163a and 163b extending in the lateral direction. Conductive pads 168 and 169 on the bottom surface of piezoelectric element 142 are connected to legs 165 extending in the lateral direction. A voltage difference is applied between pads 164 and 166, and also between pads 168 and 169. At the center of piezoelectric element 142, where legs 165 are aligned with their lengths in the lateral direction, the electric field near the bottom face of piezoelectric element 142 is substantially in the longitudinal direction, resulting in longitudinal stretching and lateral contraction of piezoelectric element 142 near its bottom surface. On the top surface of piezoelectric element 142, adjacent to the center of piezoelectric element 142, where legs 163a and 163b are aligned with their lengths in the lateral direction, there is a longitudinal electric field resulting in longitudinal stretching and lateral contraction of piezoelectric element 142 near its top surface. As a result, piezoelectric element 142 bends into the shape shown in FIG. 13. As discussed previously, reversing the polarity of voltages applied to pads 164, 166, 168 and 169 reverses the direction of bending.

Figure 18:
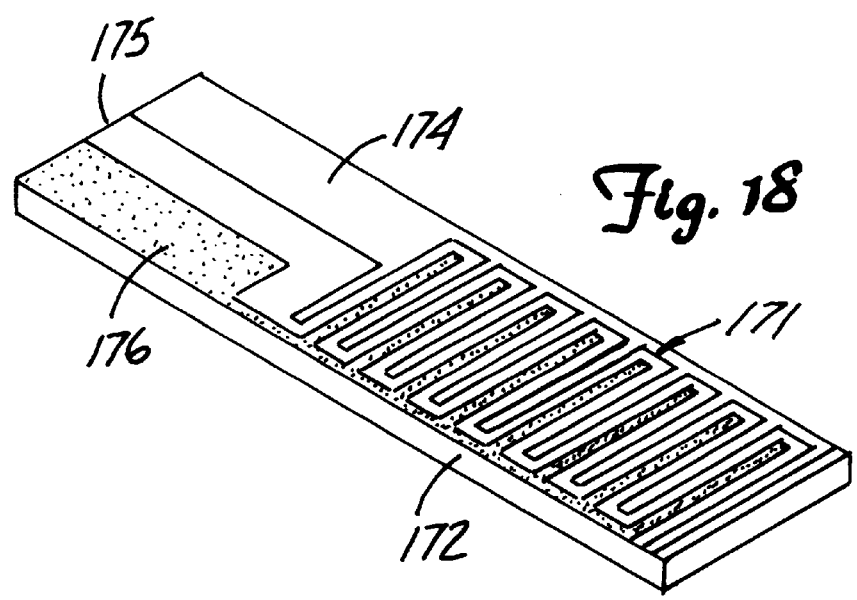
FIGS. 18 and 19 are perspective views of electrodes for a cantilevered piezoelectric microactuator according to a fifth embodiment of the present invention.
Figure 19:
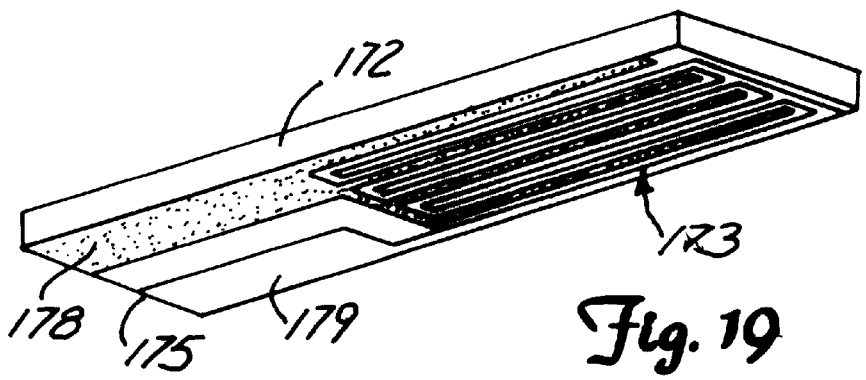

FIG. 18 is a perspective view showing the top surface, and FIG. 19 is a perspective view showing the bottom surface, of a piezoelectric element 172 for use as a cantilevered piezoelectric beam, according to a fifth embodiment of the present invention. Conductive pads 174 and 176 on the top surface of piezoelectric element 172 are connected to legs 171 extending in the lateral direction. Conductive pads 178 and 179 on the bottom surface of piezoelectric element 172 are connected to legs 173 extending in the longitudinal direction opposite the legs on the top surface of piezoelectric element 172. Piezoelectric element 172 is clamped or otherwise restrained at distal end 175, and is free to move at the opposite, proximal end. Where legs 171 on the top surface of piezoelectric element 172 are aligned with their lengths in the lateral direction, a longitudinal electric field will exist (upon application of a voltage difference between pads 174 and 176) near the top surface of piezoelectric element 172, resulting in longitudinal expansion of piezoelectric element 172. Where legs 173 on the bottom surface of piezoelectric element 172 are aligned with their lengths in the longitudinal direction, a lateral electric field will exist (upon application of a voltage difference between pads 178 and 179) near the bottom surface of piezoelectric element 172, resulting in longitudinal contraction of piezoelectric element 172. The combination of these fields and the resulting distortion of piezoelectric element 172 causes the piezoelectric beam to bend downward. Opposite voltage polarities applied to pads 174, 176, 178 and 179 will result in opposite fields, and upward bending of the piezoelectric beam.

FIG. 20 is a perspective view showing the implementation of cantilevered piezoelectric beams 172a and 172b as shown in FIGS. 18 and 19 on the leading edge surface 60 of slider 24. Insulating hills 62, 64 and 66, and ceramic members 182 and 184 are formed on leading edge surface 60 of slider 24, with members 182 and 184 spanning the spatial regions 63 and 65 between hills 62, 64 and 66. Piezoelectric beams 172a and 172b are formed on the spans of members 182 and 184. With this configuration, upward bending of piezoelectric beam 172b and downward bending of piezoelectric beam 172a causes slider 64 to rotate in the manner shown in FIG. 9.

It will be apparent to those skilled in the art that several alternative configurations and processes may be implemented based on the embodiments of the invention disclosed herein. For example, it is possible that only a single actuator element be fabricated on slider 24, while still achieving rotation of slider 24 and selective displacement of transducing head 56. Modifications of the conductor patterns in FIGS. 11–20 could also be made to alter the bending configuration of the piezoelectric element utilized in the microactuator. Conductors may be patterned on one or both sides of the piezoelectric elements in any of the embodiments of the invention. In some embodiments, planarizing material that is eventually removed may be a mechanically compliant material so that it need not be removed.

The present invention therefore provides an effective microactuator on the leading edge surface of a slider in a disc drive, able to rotate the slider to selectively displace a transducing head carried by the slider. High resolution head positioning is therefore achievable, through a relatively simple structure that can be formed by the same high volume manufacturing processes in existence for producing sliders and transducing heads.

Although the present invention has been described with reference to preferred embodiments, workers skilled in the art will recognize that changes may be made in form and detail without departing from the spirit and scope of the invention.

What is claimed is:

1. A disc drive having an actuator arm to support a slider carrying a transducing head adjacent a selected data track of a disc having a plurality of concentric data tracks, the slider having an air-bearing surface generally parallel to and confronting the surface of the rotatable disc, a leading surface generally normal to the air-bearing surface and a trailing surface opposite the leading surface, and a microactuator on the leading edge surface of the slider to effect fine positioning of the transducing head with respect to the selected track, the microactuator comprising:

a spatial region on the leading edge surface of the slider; and an elongate microactuator element spanning the spatial region and responsive to a voltage to selectively expand and contract and thereby bend to alter the position of the slider and the transducing head.

2. The disc drive of claim 1, wherein the microactuator element comprises:

a beam spanning the spatial region; and a piezoelectric element supported on the beam, the piezoelectric element being responsive to the voltage to selectively expand and contract and thereby bend the beam to alter the position of the slider and the transducing head.

3. The disc drive of claim 2, wherein the microactuator further comprises:

a bottom conductor on the beam;

a top conductor on the microactuator element; and first means for applying a first voltage to the bottom conductor and a second voltage to the top conductor, so that the first voltage is applied to a bottom surface of the piezoelectric element and the second voltage is applied to a top surface of the piezoelectric element.

4. The disc drive of claim 2, wherein the beam is a cantilevered beam restrained at a first end and the piezoelectric element is on the cantilevered beam, poled in a first direction and restrained at the first end of the cantilevered beam, the piezoelectric element having a top surface and a bottom surface and including first and second conductors selectively patterned on the top surface and third and fourth conductors selectively patterned on the bottom surface, the piezoelectric element being responsive to a voltage difference between the first conductor and the second conductor and also to a voltage difference between the third conductor and the fourth conductor to selectively expand and contract and thereby bend the cantilevered beam to alter the position of the slider and the transducing head.

5. The disc drive of claim 4, wherein the microactuator element further comprises:

a second spatial region on the leading edge surface of the slider;

a second cantilevered beam spanning the second spatial region and being restrained at a second end; and a second piezoelectric element on the second cantilevered beam, poled in the first direction and restrained at the second end of the second cantilevered beam, the second piezoelectric element having a top surface and a bottom surface and including fifth and sixth conductors selectively patterned on the top surface and seventh and eighth conductors selectively patterned on the bottom surface, the second piezoelectric element being responsive to a voltage difference between the fifth conductor and the sixth conductor and also to a voltage difference between the seventh conductor and the eighth conductor to selectively expand and contract and thereby bend the second cantilevered beam to alter the position of the slider and the transducing head.

6. The disc drive of claim 1, wherein the microactuator further comprises:

a second spatial region on the leading edge surface of the slider; and a second microactuator element spanning the second spatial region and responsive to a voltage to selectively expand and contract and thereby bend complementary to bending of the first-named microactuator element to alter the position of the slider and the transducing head.

7. The disc drive of claim 6, wherein the first-named and second microactuator elements comprise:

a beam spanning the first-named spatial region and the second spatial region; and a piezoelectric element supported on the beam, the piezoelectric element having first and second portions adjacent the first-named and second spatial regions, respectively, the first and second portions of the piezoelectric element being responsive to applied voltages to selectively complementarily expand and contract and thereby bend the beam to alter the position of the slider and the transducing head.

8. The disc drive of claim 1, wherein the microactuator further comprises:

a second spatial region on the leading edge surface of the slider; and wherein the microactuator element is an elongated piezoelectric element spanning the first-named and second spatial regions, poled in a first direction, having top and bottom surfaces and including first and second conductors patterned on the top surface, the elongated piezoelectric element being responsive to a voltage difference between the first and second conductors to selectively expand and contract and thereby bend to alter the position of the slider and the transducing head.

9. The disc drive of claim 8, wherein the elongated piezoelectric element further includes third and fourth conductors selectively patterned on the bottom surface, the elongated piezoelectric element being further responsive to a voltage difference between the third and fourth conductors to selectively expand and contract and thereby bend to alter the position of the slider and the transducing head.

10. The disc drive of claim 1, wherein the microactuator includes first and second hills on the leading edge surface of the slider, the microactuator element being on the hills and spanning the spatial region between the hills and between the microactuator element and the leading edge surface of the slider.

11. A method of forming a microactuator on a leading edge surface of a slider carrying a transducing head to effect fine positioning of the transducing head with respect to a selected track of a disc having a plurality of concentric tracks, the slider having a trailing edge surface opposite the leading edge surface and an air-bearing surface generally parallel to and confronting a surface of the disc, normal to the leading edge surface and the trailing edge surface, the method comprising:

forming a spatial region on the leading edge surface of the slider;

forming a microactuator element spanning the spatial region of a piezoelectric material having top and bottom surfaces; and poling the microactuator element in a first direction, so that the piezoelectric material is responsive to a voltage difference between the top and bottom surfaces to selectively expand and contract and thereby bend to alter the position of the slider and the transducing head.

12. The method of claim 11, wherein the step of forming the microactuator element comprises:

forming a beam spanning the spatial region;

forming a bottom conductor on the beam;

forming the piezoelectric element on the bottom conductor; and forming a top conductor on the piezoelectric element.

13. The method of claim 11, further comprising:

forming a second spatial region on the leading edge surface of the slider;

forming a second microactuator element on the second beam of piezoelectric material having a top surface and a bottom surface; and poling the second microactuator element in the first direction, so that the second piezoelectric element is responsive to a voltage difference between the top and bottom surfaces to selectively expand and contract and thereby bend the second beam complementary to bending of the first-named beam to alter the position of the slider and the transducing head.

14. The method of claim 13, further comprising forming first and second beams spanning the first and second spatial regions, respectively, and forming first and second bottom conductors on the first and second beams, respectively, wherein the steps of poling the first and second microactuator elements comprise:

placing a poling conductor on the first and second microactuator elements;

applying a reference voltage to the first bottom conductor and the second bottom conductor;

applying a poling voltage to the poling conductor to pole the first and second microactuator elements in the first direction; and removing the poling conductor.

* * * * *